DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1209

T896,052

WIRE AND CABLE WRAPPING MATERIAL

Gerald H. Zimmerman, Claymont, Del., assignor to Hercules Incorporated, Wilmington, Del.

Filed Dec. 4, 1970, Ser. No. 95,228
**Int. Cl. B32b *3/00***
U.S. Cl. 161—123
1 Sheet Drawing. 5 Pages Specification

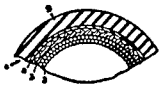

An improved dielectric protective barrier for electrical conductive wire and cable is provided by a striated film of a plastic material having high dielectric strength. Preferred plastic materials are polyethylene terephthalate and polypropylene. The striated film acts as an improved thermal insulator because of the natural insulating effect of the polymer and also due to the entrapment of air between the raised ribs of the film. During periods of over potential on the wire conductors the barrier sheet helps to prevent a dielectric failure of the insulation on the conductors.